UNITED STATES PATENT OFFICE.

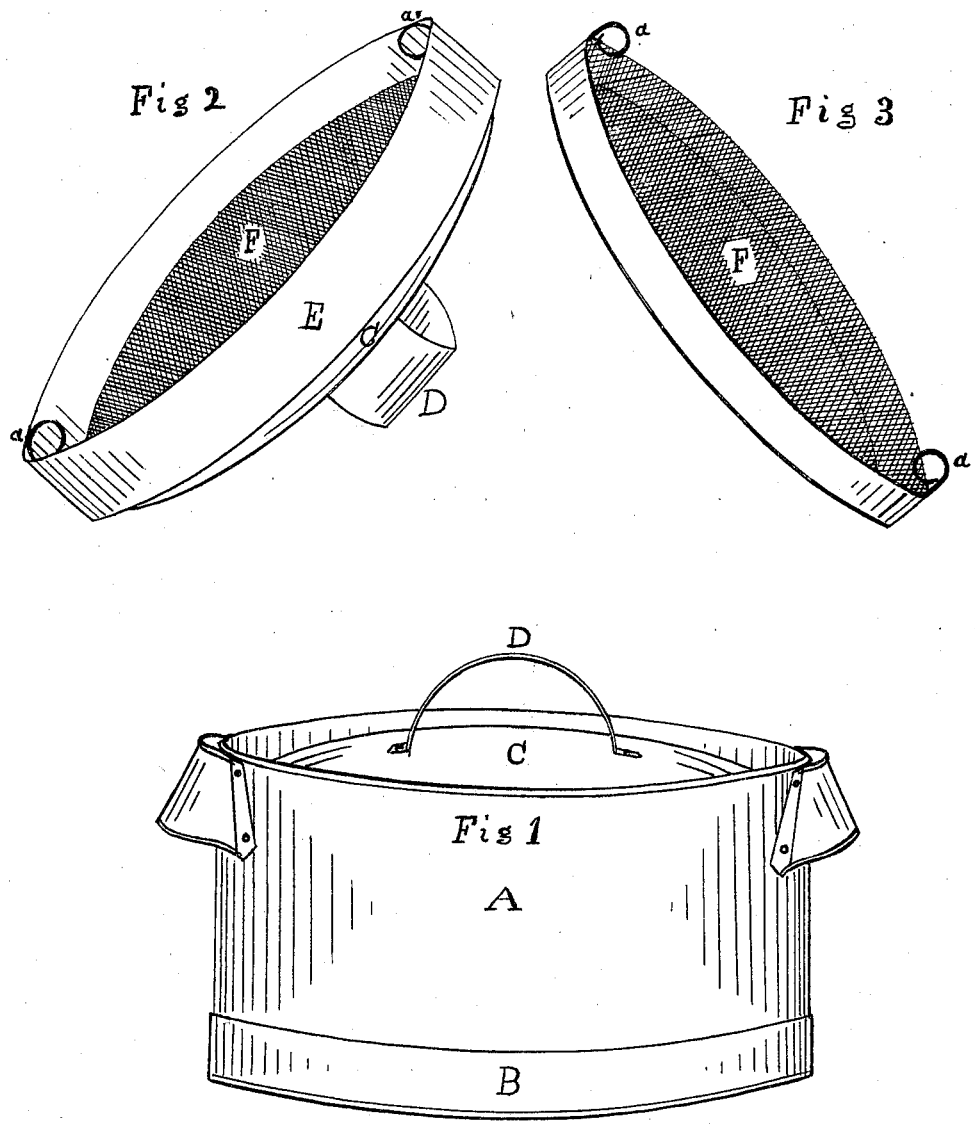

WILLIAM K. WYCKOFF, OF RIPON, WISCONSIN.

IMPROVEMENT IN MEAT-BAKERS.

Specification forming part of Letters Patent No. 131,383, dated September 17, 1872.

*To all whom it may concern:*

Be it known that I, WILLIAM K. WYCKOFF, of Ripon, in the county of Fond du Lac and State of Wisconsin, have invented a certain Improved Savor-Retaining Meat-Baker, of which the following is a specification:

The first part of my invention relates to the combination of a tight-fitting cover, sliding downward or upward within a suitable pan or vessel in such a manner that the flange of the said cover shall hug tightly against the inner side of the baking-pan, thereby effectually retaining all the vapor and savory parts of meat or other articles while cooking, and which by all other processes commonly employed are rapidly dissipated and entirely lost. The peculiar merits of this baker consist in making even the toughest meats deliciously tender, in addition to retaining the savors to the greatest degree, and involves the same principle by which hunters, trappers, and pioneers have from time immemorial cooked game and fish, simply by inclosing with plastic clay and burying beneath the hot ashes and coals of a camp-fire. By this process no attention is required after the pan is closed and placed in the oven. A quite moderate heat is the best, and the time that should elapse may be from one to five hours, according to the nature or condition of the article to be cooked, and no damage will result from overtime, even if it should extend from one-half to a full hour. In preparing meats for the baker cut in convenient pieces, rub them with salt and pepper, and a little sugar, if desired; (add some butter or suet if greased paper is not used,) and then put in a little cold or lukewarm water, pushing the cover down nearly to the meat, or until it fits tightly. The second part of my invention relates to the combination of a screen or perforated diaphragm placed within the cover in such a manner that it shall stay in position, and serves to hold a buttered or greased paper above, and to supply the meat with drippings—that is, it provides an automatic basting device. On the upper surface of this diaphragm, when in the cover and both are in place within the pan, a paper, spread with butter or other basting or flavoring materials, should rest.

Figure 1 is an elevation of the baker with the cover depressed into the body of the pan, and shows the elevating flange or rim at the bottom. Fig. 2 represents the cover placed in a position to show the relative width of its rim or flange, also the position of the diaphragm within the cover. Fig. 3 is the diaphragm detached from the cover, and shows the rim or ring surrounding its outer edge, also the small ears by which the diaphragm may be handled.

A is the baker or pan, properly constructed, usually of sheet-iron—but other materials may be used—in a round or square form, of any suitable size to serve its purpose and which the capacity of the oven will admit, and with ears or handles for convenience in use. B is a supporting flange or rim surrounding the bottom of the baking-pan. C is a cover with a handle or ear, D, said cover being made to fit snugly within the inner side of the baking-pan A, and movable downward or upward, having a flange or rim, E, from one and a half to about three inches in width, according to the size of the pan A, this flange E being attached to the cover C by double seaming, and so constructed that it shall hug tightly against the inner side of the pan A when pushed down to its proper place. F is a wire cloth or perforated diaphragm fitting tight enough so that it shall not be easily displaced from its position within the flange or rim E attached to the cover C; and *a a* are small ears fastened to the diaphragm F, for convenience in removing it from the cover.

I claim—

The pan A, provided with the adjustable cover C and its detachable open-work diaphragm F, all constructed as described, for the purpose set forth.

WILLIAM K. WYCKOFF.

Witnesses:
JASON HITCHCOCK,
I. H. WYCKOFF.